April 26, 1966      B. DAVIS      3,247,604
METHOD OF COLORING A GROOVED SHEET
Filed Oct. 17, 1963

INVENTOR.
BY Bruce Davis
Ralph Hammar
Attorney

United States Patent Office 3,247,604
Patented Apr. 26, 1966

3,247,604
METHOD OF COLORING A GROOVED SHEET
Bruce Davis, 1910 Downing Ave., Erie, Pa.
Filed Oct. 17, 1963, Ser. No. 316,894
1 Claim. (Cl. 35—26)

This invention is an apparently plain sheet on which the guide lines of a picture appear when the sheet is rubbed with a contrasting color. The picture is finished by tracing the guide lines with the desired color and by further coloring, if desired.

Figures 1, 2:
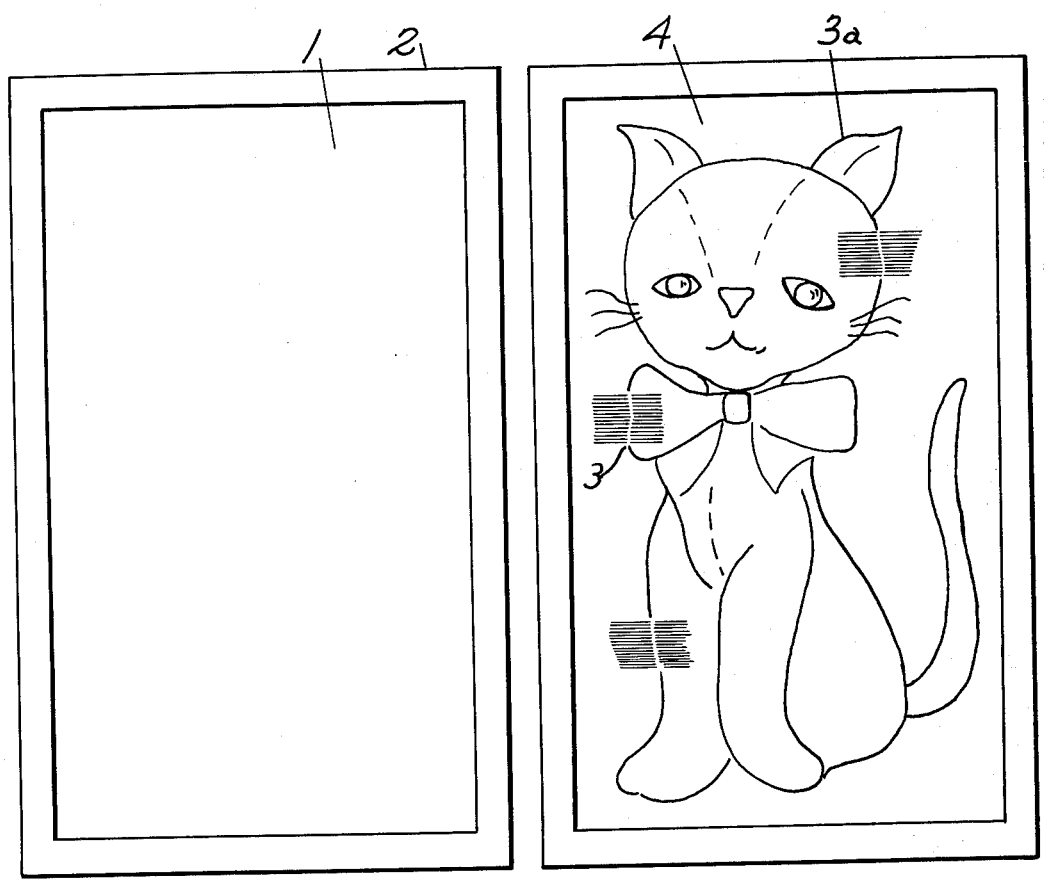

In the drawing, FIG. 1 shows the uncolored sheet; FIG. 2 shows the sheet after rubbing with a color, part of the picture showing the guide lines ready to be traced and part of the picture showing the guide lines traced; and FIG. 3 is an enlarged fragmentary section.

The uncolored sheet 1 appears perfectly plain. It may have a border 2 colored to harmonize or contrast with the ultimate picture. Close examination would reveal the guide lines of the picture impressed in the surface of the sheet, but these guide lines are imperceptible to the intended user, children of the age to be amused by coloring.

To bring out the guide lines of the picture, the field within the border is rubbed with a contrasting color. When this is done, the field (except for the guide lines) becomes essentially uniformly colored. The guide lines 3 appear as uncolored lines in a colored field 4.

Figure 3:
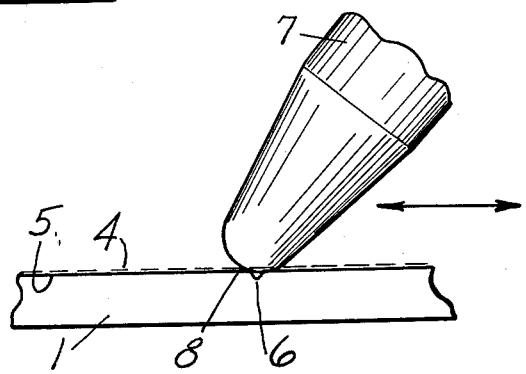

The reason this happens is illustrated in FIG. 3 where 5 indicates the surface of sheet 1 to be colored and 6 indicates indentations which form the uncolored guide lines 3 when the color 4 is rubbed on the surface 5. When the coloring is done by a pencil 7, the point 8 of the pencil rides over the top of the indentations 6 and leaves the indentations uncolored (the color of the sheet) so as to provide the guide lines 3. FIG. 3 shows on an enlarged scale the relative size of the indentations 6 compared to the point of a pencil.

No particular form of coloring implement is needed. Pencils, chalk, or crayons may be used. Fingers dipped in dry color produce good results. Any coloring implement which may be rubbed over the surface is satisfactory. Liquids such as ink have a tendency to run and, therefore, are not satisfactory.

After the field 1 has been rubbed with a color, the guide lines 3 are traced with a pencil or crayon, producing the picture outline. It is not essential that the guide lines be accurately followed. The tracing is usually a great deal wider than the guide lines. After the guide lines are filled in, as indicated at 3 in FIG. 2, further coloring may be made to finish the picture.

The maximum width of the indentations 6 is so small that the indentations are imperceptible except upon close examination. The width of the indentation 6 is not critical. Indentations of $1/64''$ width have been used. So have indentations of $1/128''$ width. Narrower indentations may be used.

No particular weight of paper is required. Ordinary writing paper is satisfactory. So are the heavier weights. Even onionskin is satisfactory, although many would consider it of too light weight for coloring. Since a surface phenomenon is involved, any material having a surface which may be colored and which is capable of receiving and holding the indentations 6 is satisfactory.

What is claimed as new is:
The method of coloring a sheet having formed thereon a picture to be colored consisting of substantially imperceptible grooves formed in its surface which remain uncolored and define guide lines of the picture when the surface is rubbed with an instrument carrying a first dry color contrasting with the sheet, which comprises first rubbing the surface of the sheet with an instrument having a sheet contacting portion of width greater than the width of the groves and carrying a first dry color contrasting with the sheet whereby the grooves remain uncolored, and then tracing the uncolored guide lines with an instrument having a second color contrasting with the first color.

References Cited by the Examiner

UNITED STATES PATENTS

| | | | |
|---|---|---|---|
| 1,129,573 | 2/1915 | Johnson | 35—26 X |
| 1,187,881 | 6/1916 | Armstrong | 35—26 X |

FOREIGN PATENTS 734,391  7/1955  Great Britain.

OTHER REFERENCES

Todd: "Tricks Every Boy Can Do," Hart Publishing Company, 1948.

EUGENE R. CAPOZIO, *Primary Examiner.*